UNITED STATES PATENT OFFICE.

CHARLES M. ARMSTRONG, OF TOLEDO, OHIO.

COMPOSITION FOR PLASTERING WALLS.

SPECIFICATION forming part of Letters Patent No. 516,462, dated March 13, 1894.

Application filed November 11, 1893. Serial No. 490,649. (No specimens.)

*To all whom it may concern:*

Be it known that I, CHARLES M. ARMSTRONG, of Toledo, county of Lucas, and State of Ohio, have invented certain new and useful Improvements in Compositions for Plastering Walls, Ceilings, &c.; and I do hereby declare that the following is a full, clear, and exact description of the invention, which will enable others skilled in the art to which it appertains to make and use the same.

My invention relates to a composition for plastering walls, ceilings, &c.

The object of the invention is to produce a composition for these purposes that shall possess the requisite tenacious strength to form a wall covering of practical indestructibility, with a certain amount of pliancy to allow of indentation rather than fracture or abrasion when contacted with a hard substance.

A further object is to produce a composition capable of being transported in a dried state and readily soluble in water, to restore the same to the necessary plasticity to be spread upon the wall.

A further object is to produce a composition capable of being plastered upon the wall, and molded in any desired design or embellishment, with a universal, partial, or varied tint to heighten the effect. And finally, the object is to produce a composition for plastering that shall be inexpensive of construction, and that shall possess the further merit of non-conductibility of heat or cold.

The highest point of superiority to be attained in a wall covering is inherent strength to firmly support the same upon the wall, non-conductivity, and a sufficient amount of pliability to avoid fracture. While the proper amount of tenacious strength may be given to the ordinary plastering composition, there is a deficiency in the two last named properties, it being brittle and dense; hence, the tendency to fracture, and consequent conductivity. I have produced a composition which is elastic to withstand impact indenting rather than abrading, possessing the highest degree of strength, and capable of receiving any desired embellishment or tint. I have also produced a composition for the purpose described, which can be prepared, molded into sheets, and dried, for transportation, and afterward rendered plastic for use.

In preparing the composition, I employ a base of pulp, preferably about six parts; hydraulic cement to harden, one part; gypsum, raw or refined, as an absorbent or drier, four parts, and an animal or fish glue sizing as a binder. After thoroughly mixing the constituent parts, the composition is ready to be spread upon the wall, and may be increased in thickness to any desired degree to receive the design of a molding, or the composition may be tinted any desired shade by adding coloring matter. The composition when properly dried is somewhat ductile and impressible if any article is forcibly impacted therewith, and I have found that it can be resolved into its plastic state readily by simply supplying the amount of water originally evaporated therefrom in the process of drying, a feature of great value, as it allows of ready transportation at minimum expense. Since the composition when dried is fibrous rather than granular, there is not the amount of conductivity of heat or cold found in the ordinary wall, and in fact the composition has been found invaluable as a sheathing and packing in refrigerators by reason of its non-conductivity. While I have stated the relative proportions of parts, they may be varied greatly within the scope of my invention, while I wish to claim broadly a base of pulp, I have found pulp used in making paper to be the least expensive and to possess in greater degree the desired properties.

What I claim is—

A composition for plastering walls, ceilings, &c., comprising a base of pulp, a drying medium of gypsum, a hardening medium of hydraulic cement, and an adhesive of animal or fish glue, in substantially the proportions specified.

In testimony that I claim the foregoing as my own I hereby affix my signature in presence of two witnesses.

CHARLES M. ARMSTRONG.

Witnesses:
WILLIAM WEBSTER,
CARROLL J. WEBSTER.